M. F. BATES.
EXTENSIBLE CONTROL FOR TRACTORS.
APPLICATION FILED JUNE 11, 1918.
1,359,564.
Patented Nov. 23, 1920.
3 SHEETS—SHEET 1.
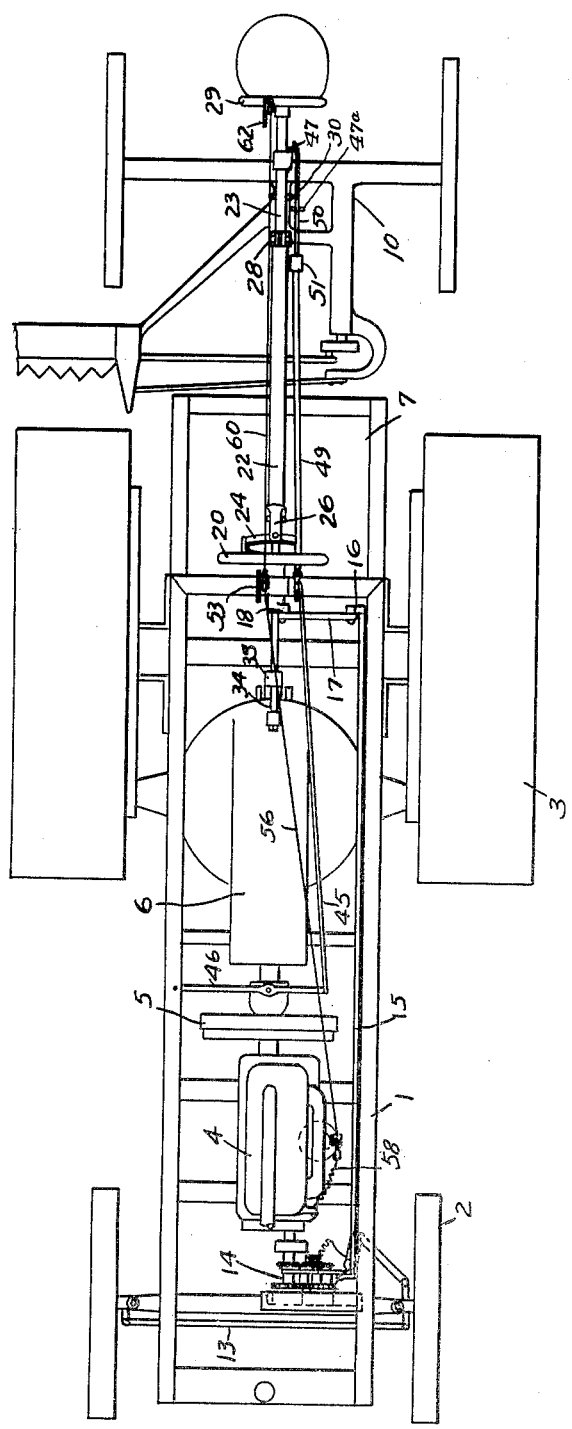
Inventor
Madison F Bates
By B. J. Wheeler
Attorney

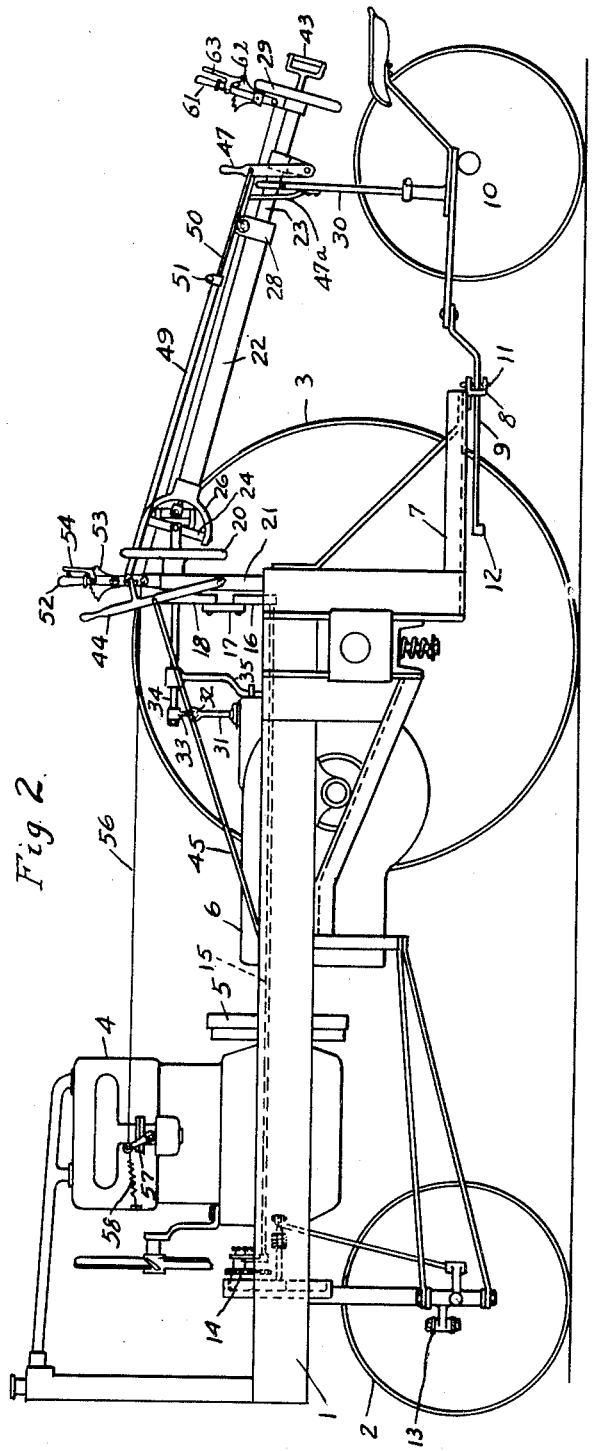

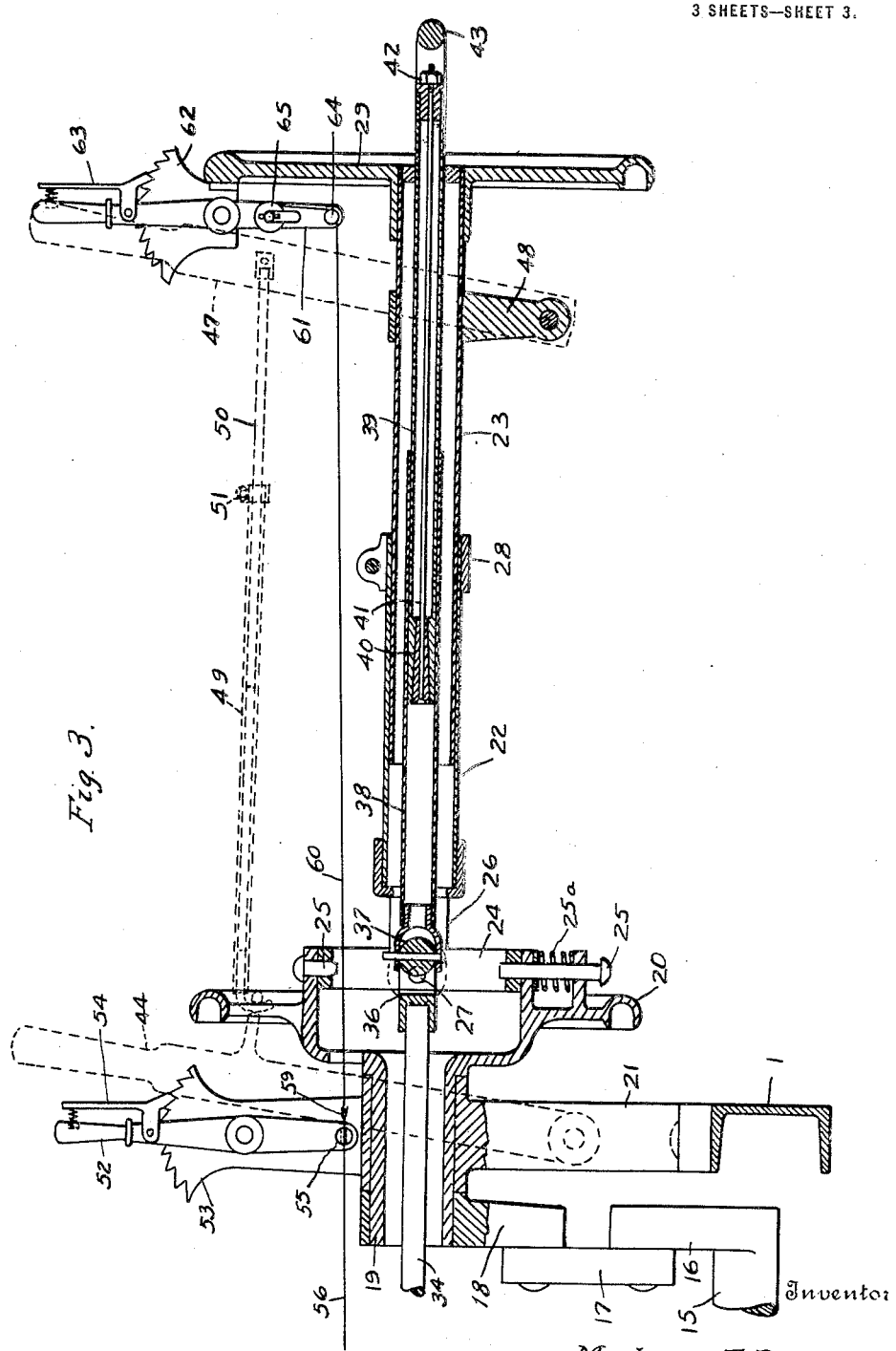

UNITED STATES PATENT OFFICE.

MADISON F. BATES, OF LANSING, MICHIGAN.

EXTENSIBLE CONTROL FOR TRACTORS.

1,359,564. Specification of Letters Patent. Patented Nov. 23, 1920.

Application filed June 11, 1918. Serial No. 239,377.

*To all whom it may concern:*

Be it known that I, MADISON F. BATES, a citizen of the United States, residing at Lansing, in the county of Ingham and State of Michigan, have invented a new and useful Extensible Control for Tractors, of which the following is a specification.

The invention relates to extensible controls for tractors and is particularly adapted for use in connection with farm tractors.

The object of the invention is primarily to make provision for exercising complete control in operating and directing the course of a tractor from the driver's seat of a farm implement or other vehicle drawn thereby, thus eliminating necessity for an operator both upon the tractor and its trailer, and accomplishing a material reduction in the cost of operation.

A further object of the invention is to provide, in such controlling means, for establishing a flexible connection between the tractor and trailer, which will be readily attachable and detachable, and which will be longitudinally adjustable to adapt it for use with implements of varying lengths of draw bars.

It is also an object of the invention to provide for yielding of the draft connection between a tractor and the implement which it draws, when for any reason the strain acting in said connection becomes excessive, and to automatically bring the tractor to a halt when such conditions arise.

In attaining the objects above recited, the invention contemplates equipping a tractor with the usual group of control devices, preferably at the rear of the machine, and providing a supplementary rear group of control devices, accessible from the trailing implement, and adjustably attachable to the devices of the forward group through suitable flexible and extensible connections.

A preferred embodiment of the essential features of the invention is disclosed in the accompanying drawings, wherein:

Figure 1 is a plan view showing a tractor drawing a farm implement and adapted to be controlled from the latter by means of the herein described mechanism.

Fig. 2 is a view of the same in side elevation.

Fig. 3 is a view in side elevation and partial section of the two sets of control devices to be respectively asociated with the tractor and an implement drawn thereby, showing the connections between said devices whereby either set may exercise control independently of the other.

In these views the reference character 1 designates the frame of a tractor, 2 the front wheels thereof, 3 the rear wheels, 4 the engine, 5 the clutch, and 6 the change speed gear casing. These elements may be arranged in any desired relation, the particular type of tractor being no feature of the invention. At the rear end of the tractor, a platform 7 is suspended from the frame 1, which platform carries at its rear end an underlying bracket 8 with which is engaged the draw-bar 9 of a farm implement or trailer of any sort such as is indicated at 10. The connection between said bracket and draw-bar is established preferably by a pin 11 carried by the bracket and engaging the bar at a distance from the forward end of the latter, said pin being designed to break when subjected to a severe strain due to excessive draft acting in the bar 9. When this takes place the tractor advances momentarily independently of the implement 10, the bar 9 meanwhile sliding through the bracket 8. There will be no complete disengagement of said bar from the bracket, however, as the bar has a lateral projection 12 at its forward end which will upon engaging the bracket 10 cause draft to be again applied to the implement. It will hereinafter be shown that the clutch 5 is automatically opened to bring the tractor to a halt when the pin 11 breaks.

The front wheels 2 are connected by the usual steering bar 13 whereby they are constrained to turn in unison, and a suitable steering mechanism indicated at 14 transmits power from the engine 5 to said wheels. Since the specific features of the power steering mechanisms 14 do not concern the present invention, the same will require no description further than to state that the operation of the mechanism 14 is effected through a rock-shaft 15 extending from the front to the rear portion of the frame near one of the sills thereof. An arm 16 is carried by the rear end of said shaft and is connected by a rod 17 to an arm 18 upon the shaft 19 of a steering wheel 20, said shaft being mounted in a standard 21 surmounting the rear end of the frame. When the wheel 20 is turned the rotation will be transmitted therefrom to the rock-shaft 15 through the arms 16 and 18 and the connecting rod 17, and thence to the mechanism 14.

Describing now the extension steering mechanism by which an occupant of the implement 10 may control the direction of the tractor, telescopically engaged tubular members 22 and 23 comprise an extensible shaft extending rearwardly from the wheel 20 and connected to the latter by a universal joint formed by a ring 24 pivoted to the wheel by pins 25 and connected to a yoke 26 on said shaft by pivot members 27 having their axis transverse to that of said pins. Preferably one of said pins 25 is yieldably held in normal engagement with the ring 24 by a spring 25ª, so that by withdrawing said pin from the ring the latter may be readily disengaged from the other pin 25 when the supplementary control means are not needed.

The members 22 and 23 are adapted to be held adjusted to any desired length by a clamping collar 28 engaging a split end portion of the outer of said members. At its rear end said extensible shaft carries a steering wheel 29, and a short distance forward of said wheel the shaft is loosely supported by a forked standard 30 carried by the frame of the implement 10. From the foregoing it is obvious that the steering wheel 29 will be operative to turn the wheel 20 and thence control the power steering mechanism without interfering with control of said mechanism directly from the wheel 20.

Shifting of the change-speed gears is accomplished through a universally pivoted lever 31 such as is commonly employed for this purpose, said lever being mounted upon the rear end of the gear casing 6. Said lever has a ball and socket connection 32 with an arm 33 carried by a rock-shaft 34, the front portion of which is mounted in a standard 35 carried by the casing 6 while its rear portion passes loosely through the hub of the steering wheel 20. A handle 36 is carried by the rear end of said shaft and serves to actuate the shaft longitudinally in order to swing the lever 51 forward or back, or to rotate the shaft for actuating said lever transversely. Within the ring 24 a universal joint connection 37 is established between the handle 36 and an extensible shaft located within the shaft 22—23 and comprising tubular members 38 and 39 telescopically connected. The rearmost member 39 has its forward portion split interior to the member 38 and engaged by a conical spreader 40 to hold the shaft adjusted to any desired length, said spreader being controlled by a rod 41 extending through the member 39 and engaged by a clamping nut 42. The rear end of the extensible shaft carries a handle 43 by which said shaft may be either rotated or longitudinally shifted in unison with the shaft 34.

For shifting the clutch 5 to make or break the drive connection an actuating lever 44 is mounted upon the standard 21, and a connecting rod 45 is extended therefrom to one end of a lever 46, pivoted upon the frame 1 and intermediately engaging the clutch. The clutch may also be controlled by a lever 47 mounted upon a bracket 48 rigidly secured to the member 23 and connected to the lever 44 by an extensible rod 49—50, the parts 49 and 50 being telescopically engaged and adapted to be held in various adjusted relations by a clamping collar 51.

The lever 47 is positioned just in back of an arm 47ª upon the standard 30, and upon relative movement of the tractor and trailer resulting from breaking of the pin 11 said lever is engaged by said arm and swung rearwardly to release the clutch 5 and halt the tractor.

The fuel supply to the engine is adapted to be controlled by a lever 52 intermediately pivoted upon a toothed segment 53 secured to the standard 21 and carrying upon its upper portion a detent 54 co-acting with said segment to hold the lever in various positions of adjustment. The lower end of said lever carries a roller 55, through which passes a wire 56 extending to and engaging the throttle control arm 57. With said arm there is also engaged a spring 58 tending to shift it to throttle closing position. A ring 59 secured to the rear end of the wire 56 prevents said end from passing through the roller 55 and also forms a connection to engage a hook upon the front end of a wire 60 which extends to the lower end of a lever 61 pivoted intermediately upon a toothed segment 62 secured to the rim of the steering wheel 29. A detent 63 upon the upper portion of the lever 61 is engageable with the teeth of said segment to hold the lever in various positions of adjustment. Preferably engagement of the wire 60 with the lever 61 is established by passing said wire over a roller 64 carried at the lower end of the lever, and thence winding it upon a drum 65 carried by the lever and adapted to be locked against unwinding. Thus provision is made for quickly adjusting the length of the wire 60 to correspond with any adjustment of the other control connections.

From the foregoing description it will be seen that the direction of the tractor, the supply of the fuel to the engine, the speed of travel, and the clutch are controllable equally as well from the trailing implement as from the tractor itself, the supplemental control connections having the necessary flexibility entailed by the relative motion of tractor and trailer, and having the extensibility essential to adapt it to implements and trailing vehicles of various sorts.

What I claim is:

1. In a device of the character described, the combination with a tractor and a trailer having draft connection therewith adapted to yield under excessive strain, means carried by the tractor for releasing the drive connection, an actuating lever for said means associated with the trailer, a support for said lever flexibly connected with the tractor, a member carried by the trailer providing a seat for said support forward of the lever, and means carried by said support engageable with the lever to release the drive connection of the tractor when the draft connection yields.

2. In a device of the character described, the combination with a tractor and a trailer having draft connection therewith, and an extension control for the change speed gearing and steering mechanism of the tractor, operable from the trailer, said control comprising a tubular steering shaft and a control rod for the change-speed gears, both reciprocatory and rotatable within said tubular shaft and projecting rearwardly beyond the same, substantially concentric universal joints in said shaft and rod, and handle members respectively carried by the rear ends of said shaft and rod.

3. In a device of the character described, the combination with a tractor and a trailer having draft connection therewith, of an extension control mechanism for operating the tractor from the trailer comprising a rotatable steering shaft, a lever having a pivotal mounting on said shaft, and a tractor control member connected to said lever for operation thereby.

In testimony whereof I sign this specification.

MADISON F. BATES.